(12) United States Patent
Modali et al.

(10) Patent No.: US 8,838,138 B2
(45) Date of Patent: Sep. 16, 2014

(54) CONTEXT AWARE GEOFENCING

(71) Applicant: Intel Corporation, Santa Clara, CA (US)

(72) Inventors: Prasad Modali, Fremont, CA (US); Uma M. Gadamsetty, Chandler, AZ (US); John Wei, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,137

(22) Filed: Dec. 28, 2012

(65) Prior Publication Data
US 2014/0187256 A1    Jul. 3, 2014

(51) Int. Cl.
*H04W 4/04* (2009.01)
*H04W 4/02* (2009.01)

(52) U.S. Cl.
CPC ..................................... *H04W 4/027* (2013.01)
USPC ...................................................... 455/456.1

(58) Field of Classification Search
CPC ....... H04W 4/02; H04W 28/04; H04W 64/00; G01N 25/56
USPC ................. 455/456.1, 456.2, 456.3; 73/29.01
See application file for complete search history.

(56) References Cited

U.S. PATENT DOCUMENTS

| | | | |
|---|---|---|---|
| 2010/0017126 | A1 | 1/2010 | Holcman et al. |
| 2010/0279706 | A1 | 11/2010 | Dicke |
| 2011/0256881 | A1 | 10/2011 | Huang et al. |
| 2012/0115512 | A1 | 5/2012 | Grainger et al. |
| 2013/0122928 | A1* | 5/2013 | Pfluger ...................... 455/456.1 |

FOREIGN PATENT DOCUMENTS

| | | |
|---|---|---|
| JP | 2011-528480 A | 11/2011 |
| KR | 10-2012-0106820 A | 9/2012 |

OTHER PUBLICATIONS

International Search Report and Written Opinion received for PCT Patent Application No. PCT/US2013/045817, mailed on Mar. 27, 2014, 12 pages.

* cited by examiner

*Primary Examiner* — Phuoc H Doan
(74) *Attorney, Agent, or Firm* — Caven & Aghevli LLC

(57) ABSTRACT

In one embodiment an electronic device comprises a display, a motion sensor, one or more wireless communication devices, and logic configured to receive, in the controller, data indicating that the controller is in motion, determine a velocity of the controller, and activate a first location service to determine a coarse location of the controller when the velocity of the controller falls above a predetermined threshold for a predetermined period of time. Other embodiments may be described.

21 Claims, 5 Drawing Sheets

CONTEXT AWARE GEOFENCING

RELATED APPLICATIONS

None.

BACKGROUND

The subject matter described herein relates generally to the field of electronic devices and more particularly to a system and method to implement context aware geofencing using electronic devices.

The term "geofencing" refers to techniques implemented in mobile computing devices in which virtual perimeters are superimposed on real geographic areas. Alerts or activities may be triggered when a virtual perimeter is approached or crossed. Geofencing techniques may be used in combination with location-based services to offer services or alerts to a user of a mobile device. Accordingly systems and techniques to provide geofencing techniques may find utility.

BRIEF DESCRIPTION OF THE DRAWINGS

The detailed description is described with reference to the accompanying figures.

DETAILED DESCRIPTION

Described herein are exemplary systems and methods to implement context aware geofencing in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
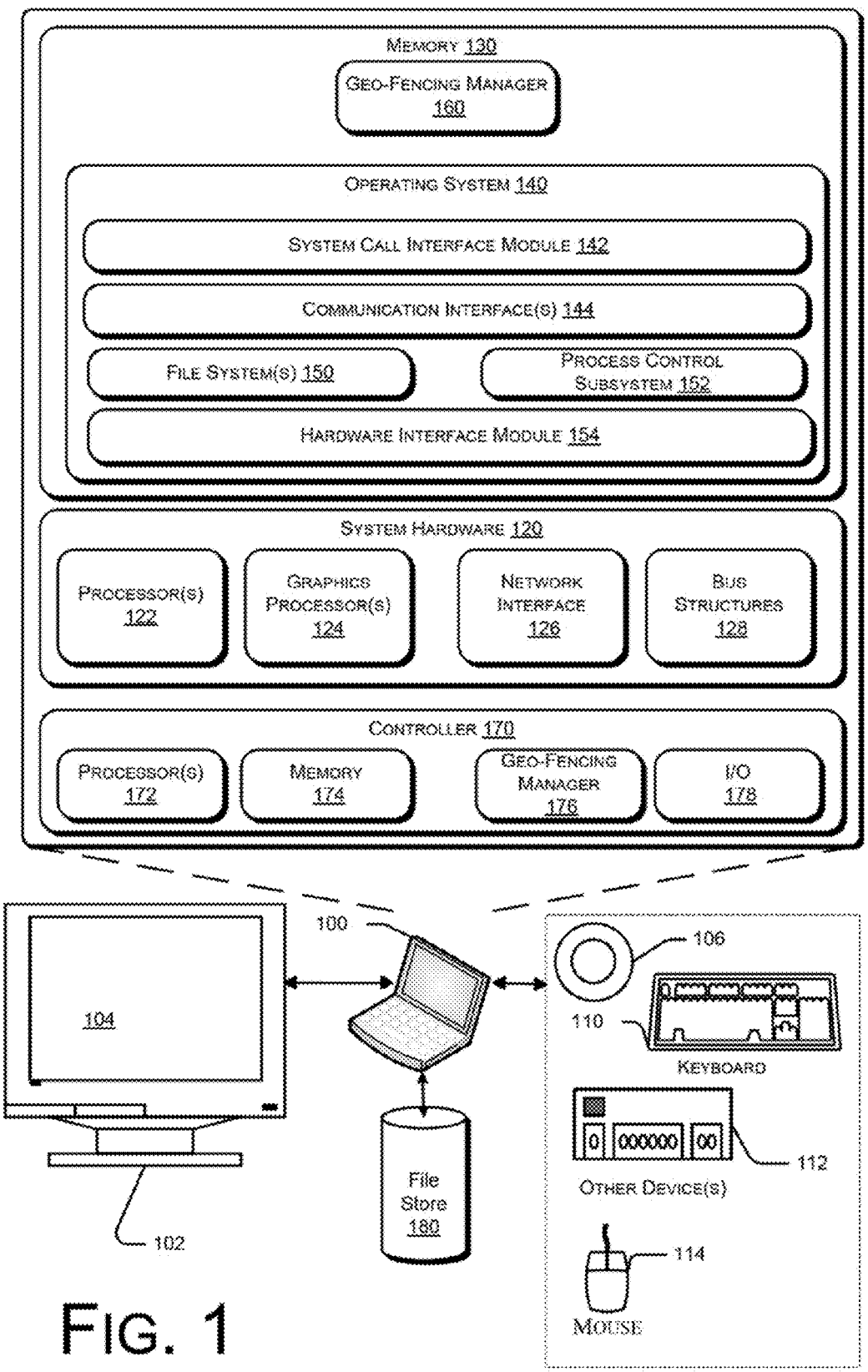
FIGS. 1-2 are schematic illustrations of exemplary electronic devices which may be adapted to implement context aware geofencing in accordance with some embodiments.

FIG. 1 is a schematic illustration of an electronic device 100 which may be adapted to implement context aware geofencing in accordance with some embodiments. In one embodiment, electronic device 100 includes one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, a geolocation device, an accelerometer/gyroscope and any other device that allows the electronic device 100 to receive input from a user.

In various embodiments, the electronic device 100 may be embodied as a personal computer, a laptop computer, a personal digital assistant, a mobile telephone, an entertainment device, or another computing device. The electronic device 100 includes system hardware 120 and memory 130, which may be implemented as random access memory and/or read-only memory. A file store 180 may be communicatively coupled to electronic device 100. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on electronic device 100.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

Memory 130 may comprise one or more applications which execute on the processor(s) 122. The applications may be stored in permanent memory such as file store 180 when not in use by the electronic device 100. In use, the applications may be copied into memory 130 for execution. In the embodiment depicted in FIG. 1 the applications comprise a geofencing manager 160 and an abstraction layer 162.

In some embodiments electronic device 100 may comprise a low-power embedded processor, referred to herein as an adjunct controller 170. The adjunct controller 170 may be implemented as an independent integrated circuit located on the motherboard of the system 100. In the embodiment depicted in FIG. 1 the adjunct controller 170 comprises a processor 172, a memory module 174, a geofencing manager 176, and an I/O module 178. In some embodiments the memory module 174 may comprise a persistent flash memory module and the authentication module 174 may be implemented as logic instructions encoded in the persistent memory module, e.g., firmware or software. The I/O module 178 may comprise a serial I/O module or a parallel I/O module. Because the adjunct controller 170 is physically separate from the main processor(s) 122 and operating system 140, the adjunct controller 170 may be made secure, i.e., inaccessible to hackers such that it cannot be tampered with.

Figure 2:
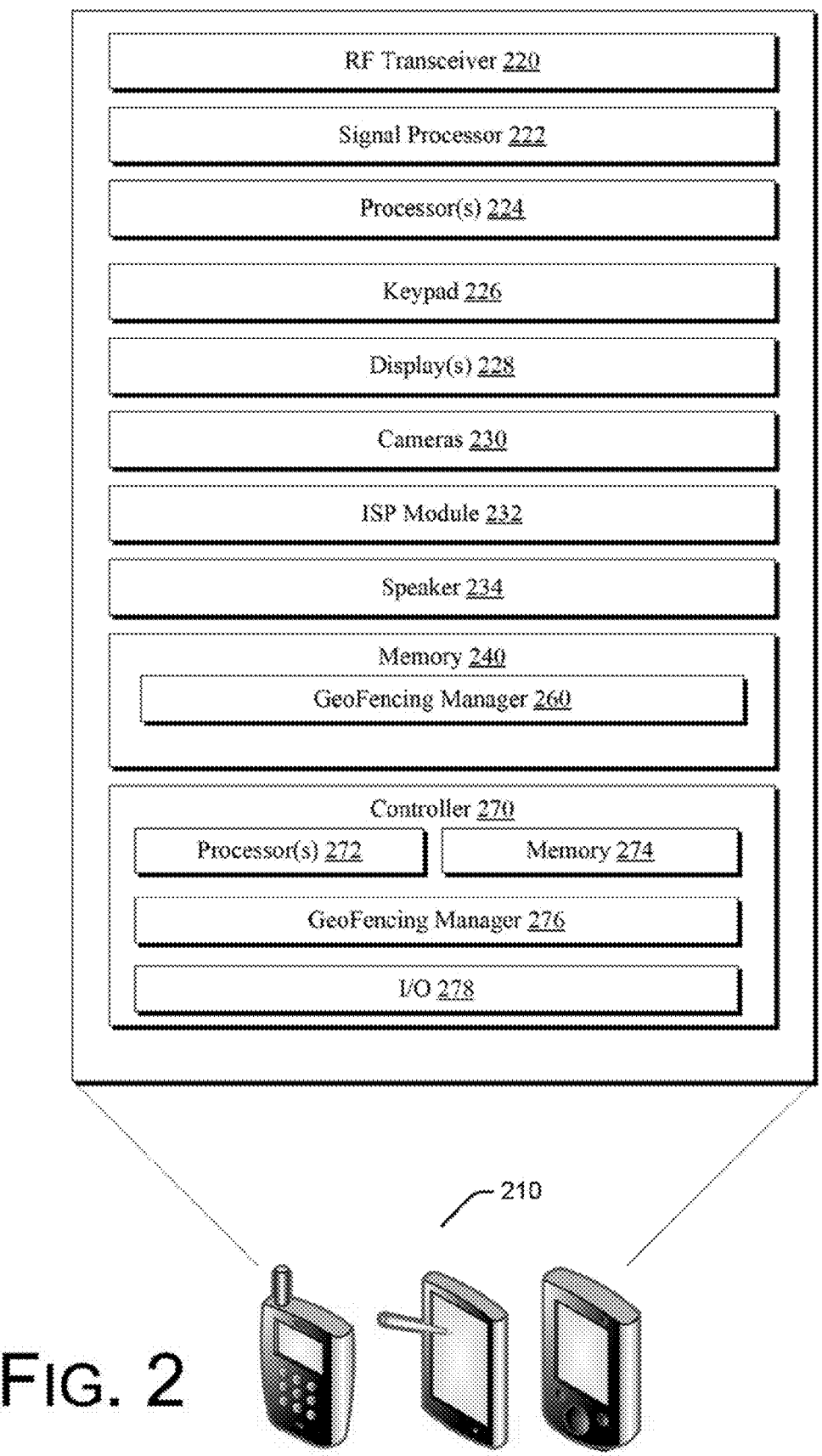

FIG. 2 is a schematic illustration of another embodiment of an electronic device 210 which may be adapted to implement context aware geofencing, according to embodiments. In some embodiments electronic device 210 may be embodied as a mobile telephone, a personal digital assistant (PDA), a laptop computer, or the like. Electronic device 210 may include an RF transceiver 220 to transceive RF signals and a signal processing module 222 to process signals received by RF transceiver 220.

RF transceiver 220 may implement a local wireless connection via a protocol such as, e.g., Bluetooth or 802.11x. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 210 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design.

In some embodiments, memory module 240 includes random access memory (RAM); however, memory module 240 may be implemented using other memory types such as dynamic RAM (DRAM), synchronous DRAM (SDRAM), and the like. Memory 240 may comprise one or more applications which execute on the processor(s) 222. In the embodiment depicted in FIG. 2 the applications comprise a geofencing manager 260 and an abstraction layer 262.

Electronic device 210 may further include one or more input/output interfaces such as, e.g., a keypad 226 and one or more displays 228. In some embodiments electronic device 210 comprises one or more camera modules 230 and an image signal processor 232, and speakers 234.

In some embodiments electronic device 210 may include an adjunct controller 270 which may be implemented in a manner analogous to that of adjunct controller 170, described above. In the embodiment depicted in FIG. 2 the adjunct controller 270 comprises one or more processor(s) 272, a memory module 274, a geofencing manager 276, and an I/O module 278. In some embodiments the memory module 274 may comprise a persistent flash memory module and the authentication module 276 may be implemented as logic instructions encoded in the persistent memory module, e.g., firmware or software. The I/O module 278 may comprise a serial I/O module or a parallel I/O module. Again, because the adjunct controller 270 is physically separate from the main processor(s) 224, the adjunct controller 270 may be made secure, i.e., inaccessible to hackers such that it cannot be tampered with.

Figure 3:
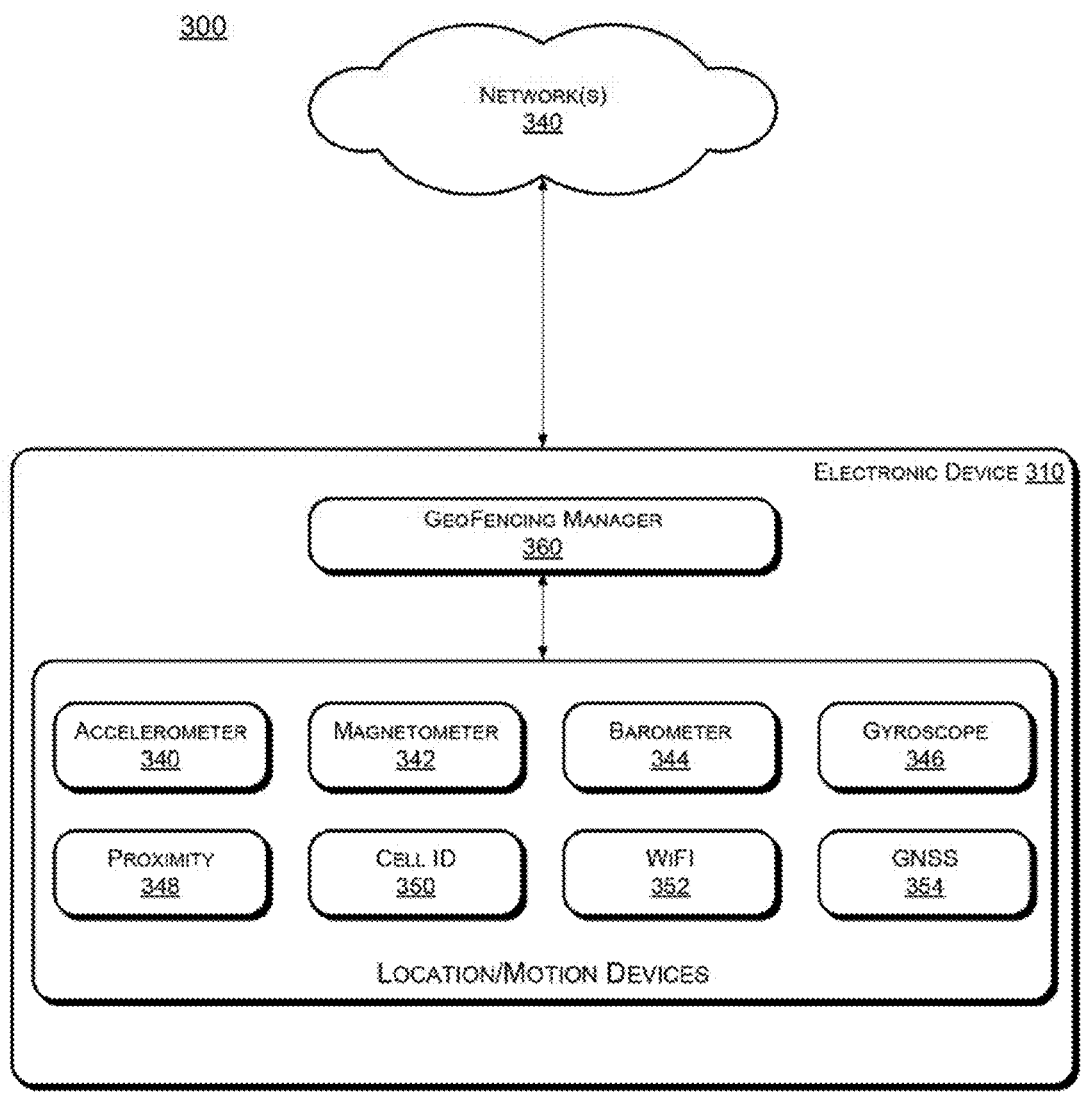
FIG. 3 is a high-level schematic illustration of an exemplary architecture for context aware geofencing in accordance with some embodiments.

FIG. 3 is a high-level schematic illustration of an exemplary architecture for context aware geofencing in accordance with some embodiments. Referring to FIG. 3, a geofencing manager 360 in an electronic device 310 be coupled to one or more location/motion devices to provide location and/or motion inputs to the geofencing manager 360. In some embodiments the location/motion devices may comprise an accelerometer 340, a magnetometer 342, a barometer 344, a gyroscope 346, a proximity detector 348, cellular network identifier 350, a WiFi identifier, or a global navigation satellite system (GNSS) receiver 352.

In some embodiments the geofencing manager implements a context aware geofencing algorithm which obtains location and geofencing data from various sources depending upon the context in which the electronic device is being used. In some embodiments the algorithm utilizes low-power devices when the device context indicates that precise location information is not necessary for geofencing operations, thereby reducing power consumption by the electronic device 300.

By way of example, a geofence definition may be received from a user of electronic device 310 via an input interface or from an application executing on the electronic device 310 or a remote device coupled to electronic device 310. In some embodiments a geofence definition can be a point, or a line or boundary, or a geographical area in an arbitrary shape such circle, ellipsis, square, rectangle, arc, polygon, belt, or overlapped zones. The geographic area may be defined by latitude/longitude coordinates, global positioning system (GPS) coordinates or the like. A geofence definition may also include one or more alert conditions. By way of example, a geofence definition may include an alert condition which triggers an alert if the electronic device 310 comes within a predetermined distance of a specified location, crosses a specified boundary, or the like.

Having described various structures of a system to implement context aware geofencing, operating aspects of a system will be explained with reference to FIG. 4, which is a state diagram illustrating operations in a method to implement context aware geofencing in accordance with some embodiments. The operations depicted in the flowchart of FIG. 4 may be implemented by the geofencing manager 360 of the electronic device 310.

Figure 4:
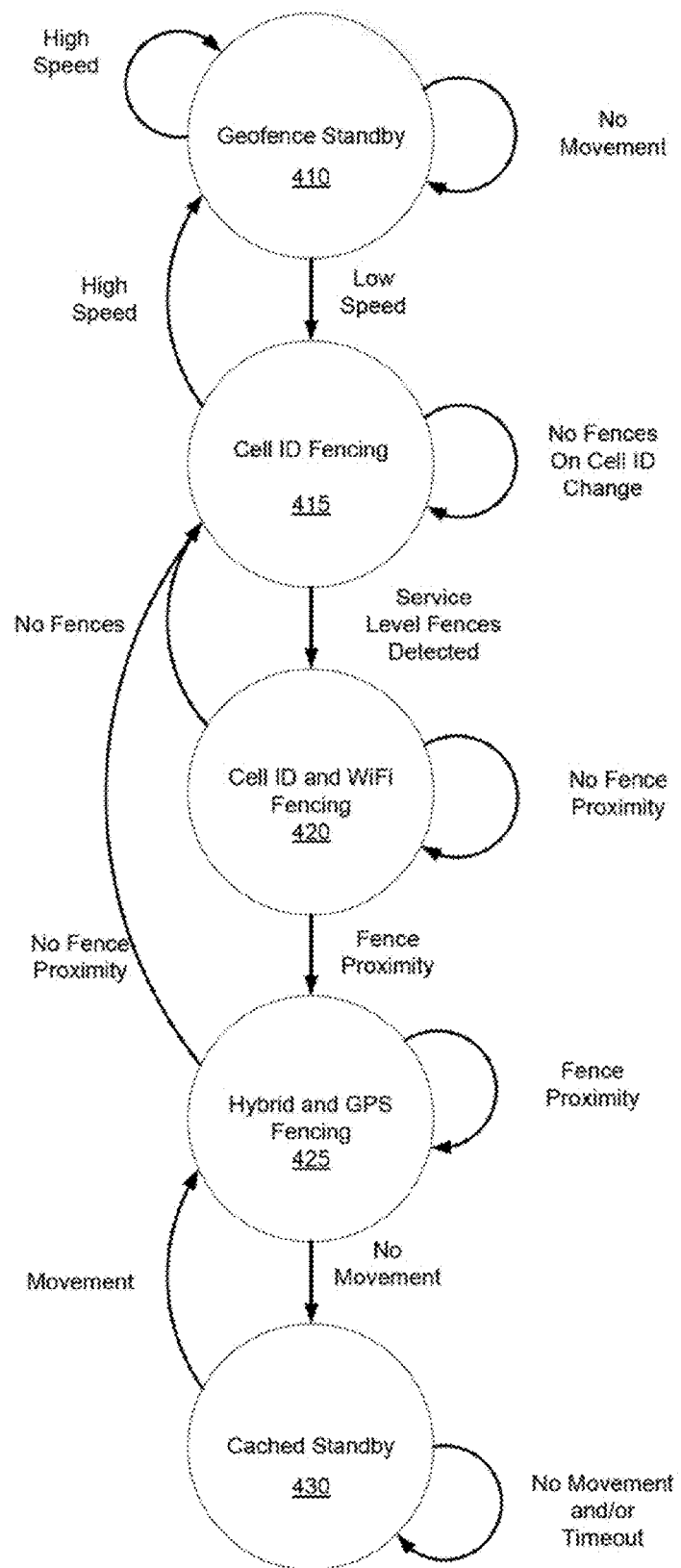
FIG. 4 is a state diagram illustrating operations in a method to implement context aware geofencing in accordance with some embodiments.

Referring to FIG. 4, the geofencing manager 360 establishes a geofence standby state as the default state for geofencing in the electronic device 300. When the electronic device 300 is in the geofence standby mode no computing relating to geofencing is performed. If an application executing on the electronic device need location information while the electronic device is in geofence standby mode then the application may retrieve geofence information cached in a memory module before the electronic device 300 entered geofence standby mode.

The geofencing manager 360 keeps the electronic device 300 in geofence standby mode as long as the electronic device 300 does not move. By contrast, if the geofencing manager 360 detects motion at a velocity within a predetermined range then the geofencing manager may change the state of the device from geofence standby state 410 to a cell ID fencing state 415. By way of example, in some embodiments the geofencing manager 360 receives inputs from location/motion device such as the accelerometer 340 and/or the gyroscope 346, and may determine a velocity at which the electronic device 300 is moving. If the electronic device 300 is moving at a rate of speed that exceeds a threshold then the geofencing manager maintains the device in geofence standby mode 410. Keeping the electronic device 300 in the geofence standby mode 410 conserves power because the electronic device does not use high power consuming location services such as global positioning system (GPS) services or WiFi services power in this mode.

If the electronic device 300 moves at a rate of speed that falls within a predetermined range and maintains that motion for a predetermined amount of time then the geofencing manager 360 changes the electronic device 300 to a cell ID fending state 415. In the cell ID fencing state the geofencing manager 360 retrieves the identifier of the cellular network cell in which the electronic device is located. The cell ID provides coarse location information for the electronic device. The geofencing manager 360 then defines a first geocircle around the coarse location provided by the cell ID and determines whether one or more geofences stored in the electronic device 300 fall within the first geocircle. As used herein, the term "geocircle" refers to a geographic region surrounding the coarse location. One skilled in the art will recognize that the geographic region need not be a circle.

If the geofencing manager 360 detects that the electronic device begins moving at a speed that exceeds a threshold then the geofencing manager 360 reverts back to the geofence standby mode 410 even if there are defined geofences within the geocircle.

If there are no geofences defined in the geocircle around the coarse location provided by the cell ID then the geofencing manager 360 maintains the electronic device 300 in the cell ID fencing state, in which the geofencing manager may periodically retrieve the ID of the network cell providing service to the electronic device, update the coarse location of the electronic device 300, and determine whether one or more geofences fall within a geocircle surrounding the coarse location, provided the device is within the velocity threshold.

If the geofencing manager 360 determines that one or more geofences fall within the geocircle surrounding the coarse location then the geofencing manager 360 changes the electronic device to a cell ID and WiFi fencing state 420. In this mode the geofencing manager may activate a WiFi location service such as a WiFi network scanner to scan for WiFi network beacons.

If no geofences are defined within the geocircle around the coarse location determined by the cell ID then the geofencing manager 360 reverts the electronic device 300 to the cell ID mode. If one or more geofences are located but the devices is not within a proximity threshold then the geofencing manager 360 maintains continues to monitor for WiFi network beacons. By contrast, if one or more geofences are defined within a predetermined proximity of the location determined by the WiFi broadcast beacon(s) then the geofencing manager 360 changes the electronic device 300 to a hybrid and GPS sensing mode in which the geofencing manager activates GPS location services to determine a location of the electronic device. In addition, the geofencing manager 360 may also utilize inputs from the various location/motion sensors to track movement of the device within the resolution of the GPS location service.

If there are no geofences proximate the location obtained by the GPS location service and the device is at a velocity that is within a predetermined range, then the geofencing manager may revert back to the cell ID state 415. By contrast, the geofencing manager 360 maintains the device in the hybrid and GPS fencing state 425 provided one or more geofences are proximate the location determined by the GPS location service. Further, if the geofencing manager 360 detects that the electronic device 300 has crossed a geofence then the geofencing manager 360 may generate an alert which may be presented on a user interface, e.g., as an audible alert, a visual alert, a tactile alert, or a combination thereof.

If the device does not move for a predetermined amount of time then the geofencing manager 360 may change the electronic device 300 to a cached standby mode 430 in which the most recent geofence information is cached in memory and the electronic device reverts to a standby mode in which high-power location services are shut off and geofencing calculations are terminated. The electronic device 300 remains in a cached standby state 430 as long as no movement is detected. By contrast, if movement is detected then the geofencing manager 360 reverts the electronic device from the cached standby state 430 back to the hybrid and GPS fencing state 425. In some embodiments the geofencing manager may implement a timer to periodically revert the electronic device from the cached standby state 430 back to the hybrid and GPS fencing state 425.

By way of example, a geofence definition may be received from a user of electronic device 310 via an input interface or from an application executing on the electronic device 310 or a remote device coupled to electronic device 310. In some embodiments a geofence definition can be a point, or a line or boundary, or a geographical area in an arbitrary shape such circle, ellipsis, square, rectangle, arc, polygon, belt, or overlapped zones. The geographic area may be defined by latitude/longitude coordinates, global positioning system (GPS) coordinates or the like. A geofence definition may also include one or more alert conditions. By way of example, a geofence definition may include an alert condition which triggers an alert if the electronic device 310 comes within a predetermined distance of a specified location, crosses a specified boundary, or the like.

Figure 5:
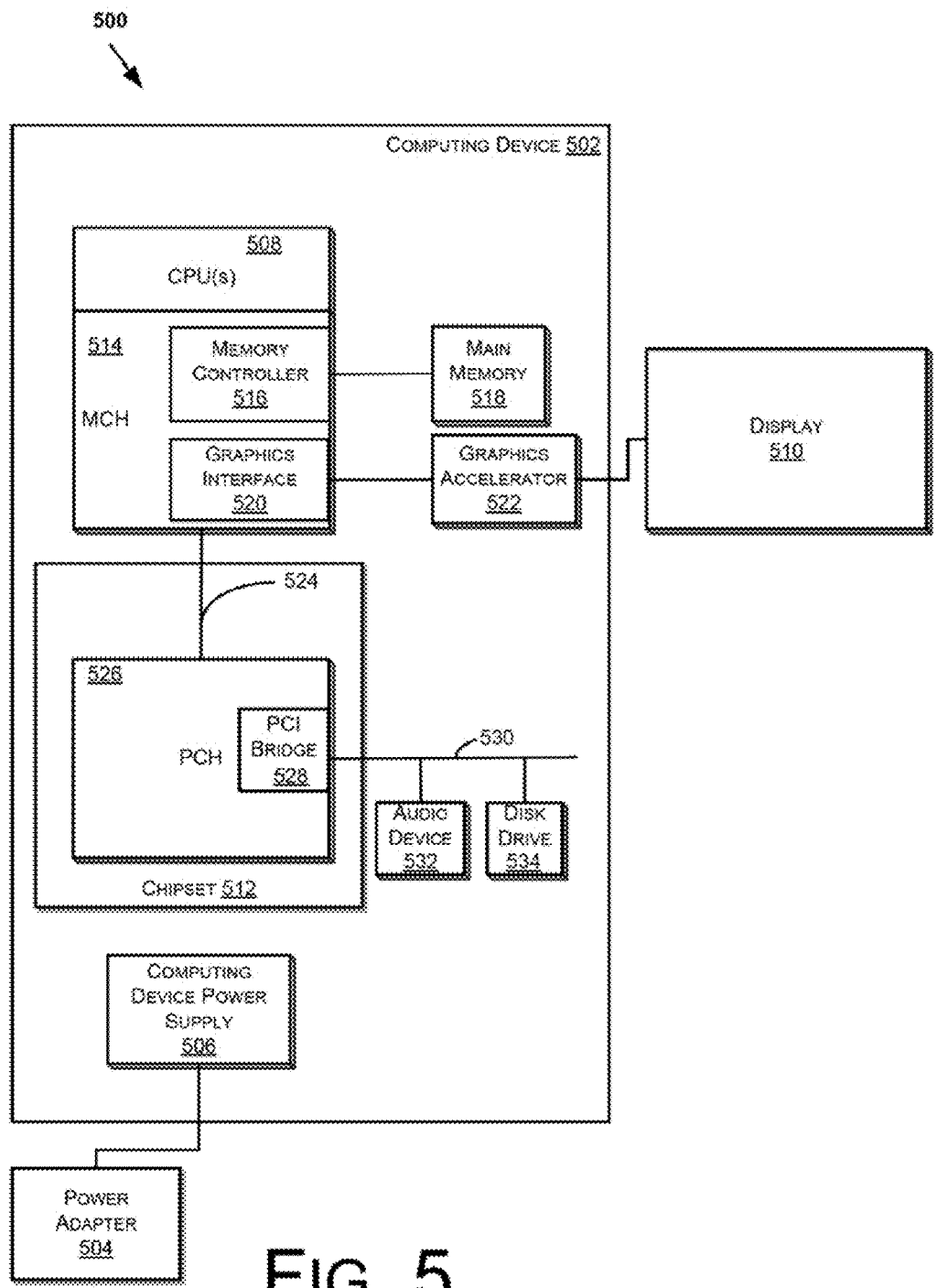
FIG. 5 is a schematic illustration of an electronic device which may be adapted to implement context aware geofencing in accordance with some embodiments.

As described above, in some embodiments the electronic device may be embodied as a computer system. FIG. 5 is a schematic illustration of a computer system 500 in accordance with some embodiments. The computer system 500 includes a computing device 502 and a power adapter 504 (e.g., to supply electrical power to the computing device 502). The computing device 502 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 502 (e.g., through a computing device power supply 506) from one or more of the following sources: one or more battery packs, an alternating current (AC) outlet (e.g., through a transformer and/or adaptor such as a power adapter 504), automotive power supplies, airplane power supplies, and the like. In some embodiments, the power adapter 504 may transform the power supply source output (e.g., the AC outlet voltage of about 110VAC to 240VAC) to a direct current (DC) voltage ranging between about 7VDC to 12.6VDC. Accordingly, the power adapter 504 may be an AC/DC adapter.

The computing device 502 may also include one or more central processing unit(s) (CPUs) 508. In some embodiments, the CPU 508 may be one or more processors in the Pentium® family of processors including the Pentium® II processor family, Pentium® III processors, Pentium® IV, CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 512 may be coupled to, or integrated with, CPU 508. The chipset 512 may include a memory control hub (MCH) 514. The MCH 514 may include a memory controller 516 that is coupled to a main system memory 518. The main system memory 518 stores data and sequences of instructions that are executed by the CPU 508, or any other device included in the system 500. In some embodiments, the main system memory 518 includes random access memory (RAM); however, the main system memory 518 may be implemented using other memory types such as dynamic RAM (DRAM), synchronous DRAM (SDRAM), and the like. Additional devices may also be coupled to the bus 510, such as multiple CPUs and/or multiple system memories.

The MCH 514 may also include a graphics interface 520 coupled to a graphics accelerator 522. In some embodiments, the graphics interface 520 is coupled to the graphics accelerator 522 via an accelerated graphics port (AGP). In some embodiments, a display (such as a flat panel display) 540 may be coupled to the graphics interface 520 through, for example, a signal converter that translates a digital representation of an image stored in a storage device such as video memory or system memory into display signals that are interpreted and displayed by the display. The display 540 signals produced by the display device may pass through various control devices before being interpreted by and subsequently displayed on the display.

A hub interface 524 couples the MCH 514 to an platform control hub (PCH) 526. The PCH 526 provides an interface to input/output (I/O) devices coupled to the computer system 500. The PCH 526 may be coupled to a peripheral component interconnect (PCI) bus. Hence, the PCH 526 includes a PCI bridge 528 that provides an interface to a PCI bus 530. The PCI bridge 528 provides a data path between the CPU 508 and peripheral devices. Additionally, other types of I/O interconnect topologies may be utilized such as the PCI Express™ architecture, available through Intel® Corporation of Santa Clara, Calif.

The PCI bus 530 may be coupled to an audio device 532 and one or more disk drive(s) 534. Other devices may be coupled to the PCI bus 530. In addition, the CPU 508 and the MCH 514 may be combined to form a single chip. Furthermore, the graphics accelerator 522 may be included within the MCH 514 in other embodiments.

Additionally, other peripherals coupled to the PCH 526 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 502 may include volatile and/or nonvolatile memory.

Thus, there is described herein an architecture and associated methods to implement trusted user input in electronic devices. In some embodiments the architecture uses hardware capabilities embedded in an electronic device platform to provide assurances to a user that user input is being made in a secure and trusted environment. In the embodiments described herein secure input operations are based on processing that occurs within a trusted environment, separate from the host operating system. The execution environment may be implemented in a trusted execution complex which presents a secure dialog box that includes one or more anti-spoof indicators on a display to provide a user assurance that the input environment is secure. In some embodiments the trusted execution complex may be implemented in a remote device, e.g., a dongle.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A context aware apparatus, comprising:
   logic, at least partially including hardware logic, configured to:
   receive, in the controller, data indicating that the controller is in motion;
   determine a velocity of the controller;
   activate a first location service to determine a coarse location of the controller when the velocity of the controller falls above a predetermined threshold for a predetermined period of time;
   define a first region around the coarse location;
   determine whether at least one part of one or more geofences overlaps with the first region
   suspend use of the first location service in response to a determination that no geofences fall within the first region
   activate a wireless fidelity network scanner in response to a determination that one or more geofences fall within the first region; and
   determine a location from one or more wireless fidelity broadcast beacons.

2. The context aware apparatus of claim 1, wherein the logic is further configured to suspend use of the wireless fidelity network scanner in response to a failure to detect one or more wireless fidelity broadcast beacons within a predetermined time.

3. The context aware apparatus of claim 1, wherein the logic is further configured to:
   activate a global positioning service (GPS) location service in response to a determination that one or more geofences fall within the first region.

4. The context aware apparatus of claim 3, wherein the logic is further configured to:
   determine a location from the GPS location service.

5. The context aware apparatus of claim 3, wherein the logic is further configured to determine whether the apparatus has reached a geofence threshold, and in response to perform at least one of:
   update a location of the context area apparatus using the GPS location service; or
   generating an alert.

6. The context aware apparatus of claim 3, wherein the logic is further configured to:
   provide the location of the controller to a processor separate from the controller.

7. The context aware apparatus of claim 3 wherein the logic is further configured to revert to a standby state when the context aware apparatus remains stationary for a predetermined period of time.

8. An electronic device, comprising:
   a display;
   a motion sensor;
   one or more wireless communication devices;
   logic configured to:
   receive, in the controller, data indicating that the controller is in motion;
   determine a velocity of the controller; and
   activate a first location service to determine a coarse location of the controller when the velocity of the controller falls above a predetermined threshold for a predetermined period of time;
   define a first region around the coarse location;
   determine whether at least one part of one or more geofences overlaps with the first region
   suspend use of the first location service in response to a determination that no geofences fall within the first region
   activate a wireless fidelity network scanner in response to a determination that one or more geofences fall within the first region; and
   determine a location from one or more wireless fidelity broadcast beacons.

9. The electronic device of claim 8, wherein the logic is further configured to suspend use of the wireless fidelity network scanner in response to a failure to detect one or more wireless fidelity broadcast beacons within a predetermined time.

10. The electronic device of claim 8, wherein the logic is further configured to:
    activate a global positioning service (GPS) location service in response to a determination that one or more geofences fall within the first region.

11. The electronic device of claim 10, wherein the logic is further configured to:
    determine a location from the GPS location service.

12. The electronic device of claim 10, wherein the logic is further configured to determine whether the apparatus has reached a geofence threshold, and in response to perform at least one of:
    updating a location of the context area apparatus using the GPS location service; or
    generating an alert.

13. The electronic device of claim 10, wherein the logic is further configured to:
    provide the location of the controller to a processor separate from the controller.

14. The electronic device of claim 10 wherein the logic is further configured to revert to a standby state when the context aware apparatus remains stationary for a predetermined period of time.

15. A computer program product comprising logic instructions stored on a tangible computer readable medium which, when executed by a controller, configure the controller to:
    receive, in the controller, data indicating that the controller is in motion;
    determine a velocity of the controller; and activate a first location service to determine a coarse location of the controller when the velocity of the controller falls above a predetermined threshold for a predetermined period of time;

define a first region around the coarse location;

determine whether at least one part of one or more geofences overlaps with the first region suspend use of the first location service in response to a determination that no geofences fall within the first region activate a wireless fidelity network scanner in response to a determination that one or more geofences fall within the first region; and determine a location from one or more wireless fidelity broadcast beacons.

16. The computer program product of claim 15, wherein the logic is further configured to suspend use of the wireless fidelity network scanner in response to a failure to detect one or more wireless fidelity broadcast beacons within a predetermined time.

17. The computer program product of claim 15, wherein the logic is further configured to:

activate a global positioning service (GPS) location service in response to a determination that one or more geofences fall within the first region.

18. The computer program product of claim 17, wherein the logic is further configured to:

determine a location from the GPS location service.

19. The computer program product of claim 17, wherein the logic is further configured to determine whether the apparatus has reached a geofence threshold, and in response to perform at least one of:

updating a location of the context area apparatus using the GPS location service; or generating an alert.

20. The computer program product of claim 17, wherein the logic is further configured to:

provide the location of the controller to a processor separate from the controller.

21. The computer program product of claim 17 wherein the logic is further configured to revert to a standby state when the context aware apparatus remains stationary for a predetermined period of time.

* * * * *